United States Patent [19]
Farsakh

[11] Patent Number: 6,041,237
[45] Date of Patent: Mar. 21, 2000

[54] METHOD OF CHANNEL ALLOCATION

[75] Inventor: Christof Farsakh, Munich, Germany

[73] Assignee: Siemens Aktinegesellschaft, Munich, Germany

[21] Appl. No.: 09/053,963

[22] Filed: Apr. 2, 1998

[30] Foreign Application Priority Data

Apr. 2, 1997 [DE] Germany .................. 197 13 666

[51] Int. Cl.$^7$ .............. H04B 7/212; H04Q 7/20
[52] U.S. Cl. .............. 455/450; 455/63; 455/509; 455/67.1; 370/329
[58] Field of Search .................. 455/450, 451, 455/452, 63, 509, 62, 67.1, 67.3; 370/329

[56] References Cited

U.S. PATENT DOCUMENTS

| | | | |
|---|---|---|---|
| 5,491,837 | 2/1996 | Haartsen | 455/62 |
| 5,828,948 | 11/1998 | Almgren et al. | 455/62 |
| 5,839,074 | 11/1998 | Plehn | 455/450 |
| 5,839,075 | 11/1998 | Haartsen et al. | 455/450 |
| 5,857,143 | 1/1999 | Kataoka | 455/450 |
| 5,930,716 | 7/1999 | Sonetaka | 455/450 |

OTHER PUBLICATIONS

PIMRC 1996, "A Real Time Downlink Channel Allocation Scheme For An SDMA Mobile Radio System," Farsakh et al. Taipeh, Taiwan.
IEEE 1995, "Near–Far Effects in Adaptive SDMA Systems," Michael Tangemann, pp. 1293–1297. Toronto, Canada.

*Primary Examiner*—Wellington Chin
*Assistant Examiner*—Simon Nguyen

[57] ABSTRACT

A method of channel allocation for a communication connection to a radio interface in a mobile communication system with spatial subscriber separation. The method includes comparing the disclosed allocation method is to compare the theoretical minimum $\tilde{P}^{(l)}$ (given optimum spatial separability) to the anticipated downlink transmission power $P^{(l)}$ for each channel in the selection of a channel. In order to speed up the calculation, the factors allocated to the K communication connections are selected proportional to the dominant eigenvectors $u_k(C_k)$. A low value for the quotient in channel l allows one to conclude that the eigenvector $u_k$ for all K communication connections respectively fits well to the covariance matrices $C_k$ of the other K−1 communication connections and, thus, a good spatial separability is established.

7 Claims, 3 Drawing Sheets

METHOD OF CHANNEL ALLOCATION

BACKGROUND OF THE INVENTION

1. Field of the Invention

The present invention is directed to a method of channel allocation for a communication connection to a radio interface in a mobile communication system with spatial subscriber separation, wherein $K_{ges}$ existing communication connections are already handled via the radio interface.

2. Description of the Prior Art

Channel allocation methods for mobile communication systems with spatial subscriber separation are known from M. Tangemann, "Near-Far effects in adaptive SDMA systems", 6th International Symposium on Personal Indoor and Mobile Radio Communications (PIMRC 95), 1995, Toronto, Canada, pp. 1293–1297. A plurality of communication connections can be handled in a common channel in such SDMA (space division multiple access) systems, wherein the channel is described by a frequency band and, potentially, a time slot in SDMA/TDMA (time division multiple access) systems. To that end, adaptive antennas are utilized at the transmission side; for example, in base stations of mobile radiotelephone networks. As a result of these adaptive antennas, a plurality of emission lobes matched by beam shaping to the respective position of the receiving radio station (for example, mobile stations of mobile radiotelephone networks), can be formed. The spatial resolution that is used for the separation of subscriber signals occurs on the basis of these mutually independent emission lobes.

The transmission path from a base station to a mobile station is referred to as "downlink", whereas the transmission path from a mobile station to a base station is referred to as "uplink." The spatial subscriber separation by beam shaping is typically utilized in the downlink. A spatial subscriber separation yields a gain in capacity in mobile communication systems since a greater plurality of communication connections, given an unaltered bandwidth required, can be handled in addition to other subscriber separation methods TDMA, FDMA or CDMA.

The problem of selecting a suitable channel for an added communication connection due to a call setup or a handover from a neighboring cell arises in mobile communication systems with SDMA subscriber separation. It is known from M. Tangemann, "Near-Far effects in adaptive SDMA systems", 61th International Symposium on Personal Indoor and Mobile Radio Communications (PIMRC 95), 1995, Toronto, Canada, p. 1294, to guarantee a predetermined signal/noise ratio wherein a common channel is allocated to spatially widely separated mobile stations of a transmission power group. When, however, the direction estimate for the positions of the mobile stations that precedes the channel allocation is imprecise, this channel allocation leads to a disadvantageous sensitivity of the spatial subscriber separation. The signal/noise ratios actually achieved fluctuate greatly.

Further allocation methods, wherein a separability test and a calculation of weighting matrices for existing communication connections are implemented, are known from F. Farsakh, J. A. Nossek, "A real time downlink channel allocation scheme for an SDMA mobile radio system", PIMRC'96, Taipeh, Taiwan, 1996. A channel-related consideration of transmission characteristics is thereby not implemented such that the characteristics defined in common for all channels do not form a stable basis for an allocation strategy. The entire beam shaping algorithm is to be respectively applied anew for calculating the weighting matrices. This leads to a considerable calculation-oriented outlay.

SUMMARY OF THE INVENTION

The present invention is directed toward specifying a method to be implemented with little calculation-oriented outlay and an apparatus for channel allocation which enables a more stable adherence to quality criteria for the communication connections on the radio interface. The inventive method for channel allocation proceeds from at least $K_{ges}$ existing communication connections in L channels of a radio interface. The radio interface is designed for a spatial subscriber separation. A suitable channel is to be selected for a further $K^{th}$ communication connection. The following method steps are implemented in a channel-related fashion for the channels $1=1 \ldots L$. K-1 thereby references the communication connections $K^{(1)}$ (sum of the $K^{(1)}$ of all L channels is equal to $K_{ges}$) already serviced in the channel l, so that the newly added communication connection is respectively referred to as $K^{th}$ communication connection.

Spatial covariance matrices and noise values are determined for the existing K-1 communication connections. An anticipated spatial covariance matrix and an anticipated noise value are also determined for the $K^{th}$ communication connection. The required, overall downstream transmission power that must be emitted in order to adhere to the required signal-to-noise ratio SNIR for the communication connections is determined for the K communication connections. The downstream transmission power derives from complex factors that are provided for a creation of directional characteristics of the spatial subscriber separation. A decision value is determined from a relationship between the anticipated downstream transmission power and a reference transmission power.

Finally, after the channel-related calculation, the channel l with the lowest decision value is selected for the allocation of the $K^{th}$ communication connection.

The decision value is a criterion for the spatial separability of the communication connections and, thus, for the quality and stability of the K communication connection after an allocation to this channel.

Since the covariance matrices and the noise values are determined in a channel-related fashion, they form a better starting basis for the channel allocation than general estimate values for the overall radio interface. The method is limited to finding a suitable channel for the added communication connection. A redistribution of existing allocations is not provided. Such a redistribution leads to a high signalling outlay in the handover which, in turn, involves losses in capacity.

The parameters of the covariance matrix and noise value to be determined for the channel allocation can be described as follows. The spatial covariance matrix indicates the spatial parameters describing the channel. Since the transmission of subscriber signals of the communication connections occurs via one or more sub-waves, the emission directions and associated powers are determined for these sub-waves. The covariance matrix for a communication connection can be developed from these particulars. The noise values are measured values of the noise level in the respective frequency channel related to the subscriber positions wherein the measured values are known from mobile radiotelephone systems. These values are determined for the newly added communication connection from measurements before the channel allocation wherein measured reception data of the opposite transmission path are potentially used.

The downstream transmission power needed for managing the K−1 communication connections is determined knowing the emission directions, the noise values and the required signal-to-noise ration SNIR. The downstream transmission power after addition of the $K^{th}$ communication connection can be derived therefrom in every channel l=1 . . . L. The quotient of downstream transmission power and a channel-referred reference power is taken as criterion for the quality of the allocation of the $K^{th}$ subscriber to the respective channel l. An improved and stable channel allocation of the radio interface that leads to fewer connection aborts due to misallocations can be achieved by thus taking into account the mutual influencings of the existing and added communication connections.

According to an advantageous development of the present invention, an eigenvector $u_k$ of the spatial covariance matrix $C_k^{(l)}$ is determined for the downstream transmission powers for the K communication connections, so that an equation system $$\begin{pmatrix} \frac{u_1^H C_1^{(1)} u_1}{N_1^{(1)} \cdot SNIR} & \cdots & -\frac{u_K^H C_1^{(1)} u_K}{N_1^{(1)}} \\ -\frac{u_1^H C_K^{(1)} u_1}{N_K^{(1)}} & \cdots & u_K^H C_K^{(1)} \frac{u_K}{N_K^{(1)} \cdot SNIR} \end{pmatrix} \cdot \begin{pmatrix} P_1 \\ P_K \end{pmatrix} = \begin{pmatrix} 1 \\ 1 \end{pmatrix} = \psi \rho \qquad (1)$$

can be developed. In this equation system, SNIR indicates the required signal-to-noise ratio and $P_1, \ldots, P_K$ indicates elements of an allocation vector p. The anticipated downstream transmission power $P^{(l)}$ in the channel l given allocation of the $K^{th}$ communication connection is determined according to the equation $$P^{(1)} = P_1, \ldots P_K = \sum_{k=1}^{K} P_k \qquad (2)$$

Due to this equation system (1), the degrees of freedom in the determination of the downstream transmission powers are limited in that the complex vectors required for the beam shaping are assumed proportional to the dominant eigenvectors $u_k$. As a result, an extremely great reduction in outlay derives in the calculation of the expected downstream transmission power $P^{(l)}$ of the $l^{th}$ channel. Thus, a reliable channel estimation also can be implemented in a short time and with reasonable outlay given antenna equipment having a plurality of individual radiators or a great plurality of communication connections per channel. The problem of beam shaping is substantially simplified.

Advantageously, the reference transmission power is defined as minimum transmission power. This occurs, for example, according to the equation $$\tilde{P}^{(1)} = SNIR \cdot \sum_{k=1}^{K^{(1)}} N_k^{(1)} / \tilde{\lambda}(C_k^{(1)}), \qquad (3)$$

whereby $\gamma(C_k^{(l)})$ indicates the respective dominant eigenvalue of the spatial covariance matrix $C_k^{(l)}$. A theoretically possible minimum power is thus available as reference power which differs from channel to channel and thus describes the individual characteristics of the individual channel quite well. The decision value $c^{(1)}$ derives as quotient $c^{(l)} = P^{(l)} / \tilde{P}^{(l)}$.

When a negative value is identified in the evaluation of the elements $P_1, \ldots, P_K$, then the decision value $c^{(1)}$ is set to a very large value. This channel does not come into consideration for an allocation. For determining the eigenvector $u_k$, a dominant eigenvector of the covariance matrix $C_k^{(l)}$ normed to the length l is advantageously determined for a respective communication connection.

According to the aforementioned method steps, a best channel is constantly found for a channel allocation. In order to prevent the radio interface from being overloaded due to allocation of too great a plurality of communication connections and threatening an abortion of already existing communication connections, an intelligent rejection mechanism is introduced. The decision value $c^{(l)}$ for the selected "best" channel l is compared to a threshold r and a channel is allocated only dependent on this allocation. Otherwise, the channel allocation for the $K^{th}$ communication connection is rejected. For example, the threshold lies at 3 dB. A collapse of the beam shaping of the downlink is prevented by this rejection mechanism.

Additional features and advantages of the present invention are described in, and will be apparent from, the Detailed Description of the Preferred Embodiments and from the Drawings.

DETAILED DESCRIPTION OF THE PREFERRED EMBODIMENTS.

Figure 1:
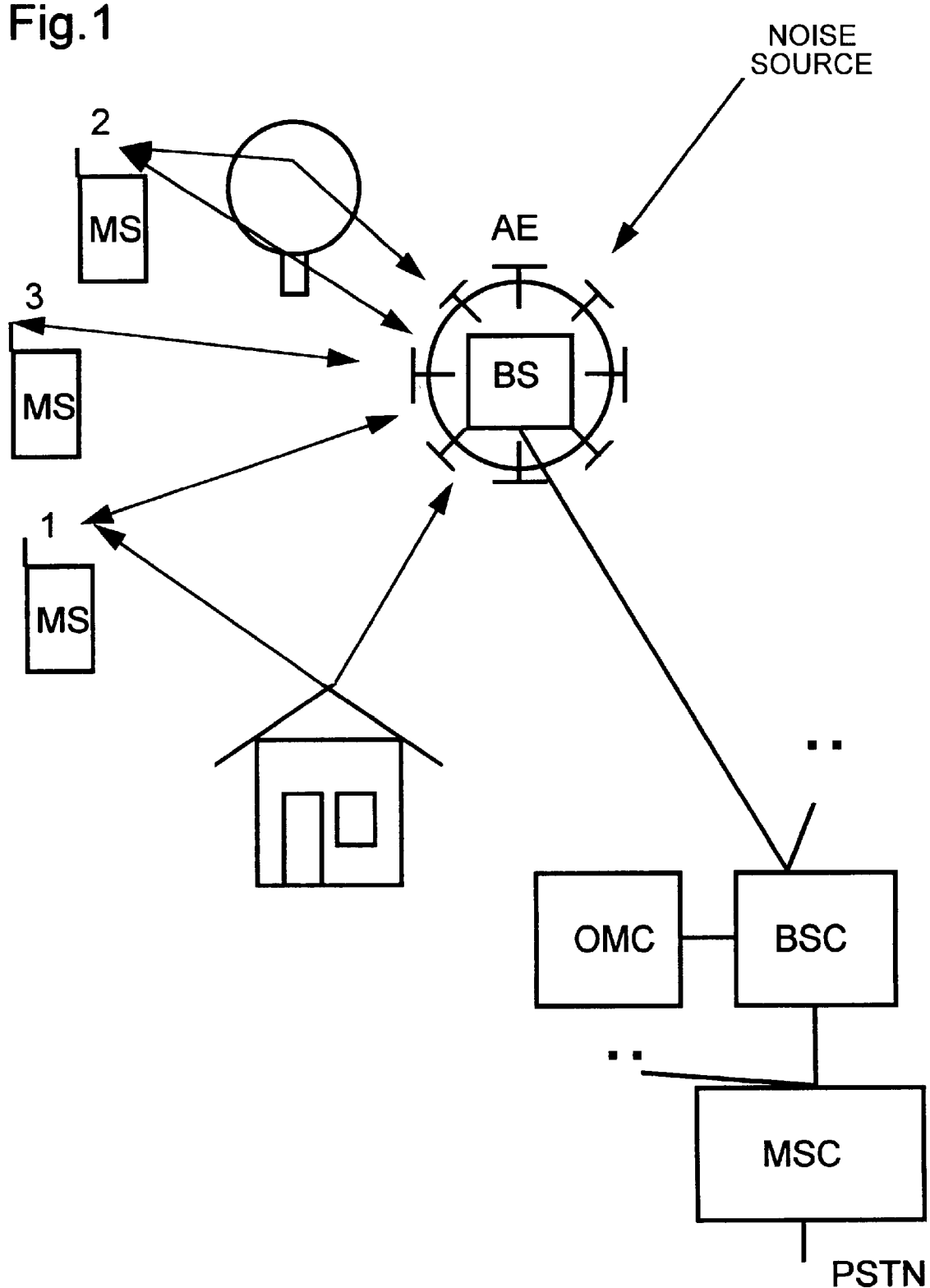
FIG. 1 shows a schematic illustration of a mobile communication system.

The mobile communication system shown in FIG. 1 corresponds, in structure, to a known GSM mobile radio-telephone network that is composed of a plurality of mobile switching centers MSC that are networked with one another or, respectively, produce the access to a public switched telephone network PSTN. These mobile switching centers MSC are respectively connected to at least one base station controller BSC. Each base station controller BSC enables a connection to at least one base station BS. Such a base station BS is a radio station that can set up a message connection to mobile stations MS via a radio interface.

By way of example, FIG. 1 shows three radio connections between three mobile stations MS and a base station BS. An operations and maintenance center OMC realizes monitoring and maintenance functions for the mobile radiotelephone network or, respectively, for parts thereof. The functionality of this structure is transferrable to other mobile radiotelephone networks or equipment for wireless subscriber connections in which the invention can be employed.

The communication connections between the base station BS and the mobile stations MS are subject to a multipath propagation that is produced by reflections at, for example, buildings or plantings, in addition to the direct propagation path. When one assumes movement of the mobile stations MS, then the multipath propagation, together with the influences of noise sources, lead to the fact that the signal components of the various propagation paths of a subscriber signal are superimposed in a time-dependent fashion at the receiving base station BS. It is also assumed that the subscriber signals of various mobile stations MS are superimposed to form a reception signal at the reception location.

The base station BS shown in FIG. 1 includes an antenna AE having eight individual radiators that form an adaptive antenna. A spatial subscriber separation is implemented by a beam shaping in the base station BS. The beam shaping is implemented for the downstream direction. Other evaluation methods are utilized in the upstream direction.

Figure 2:
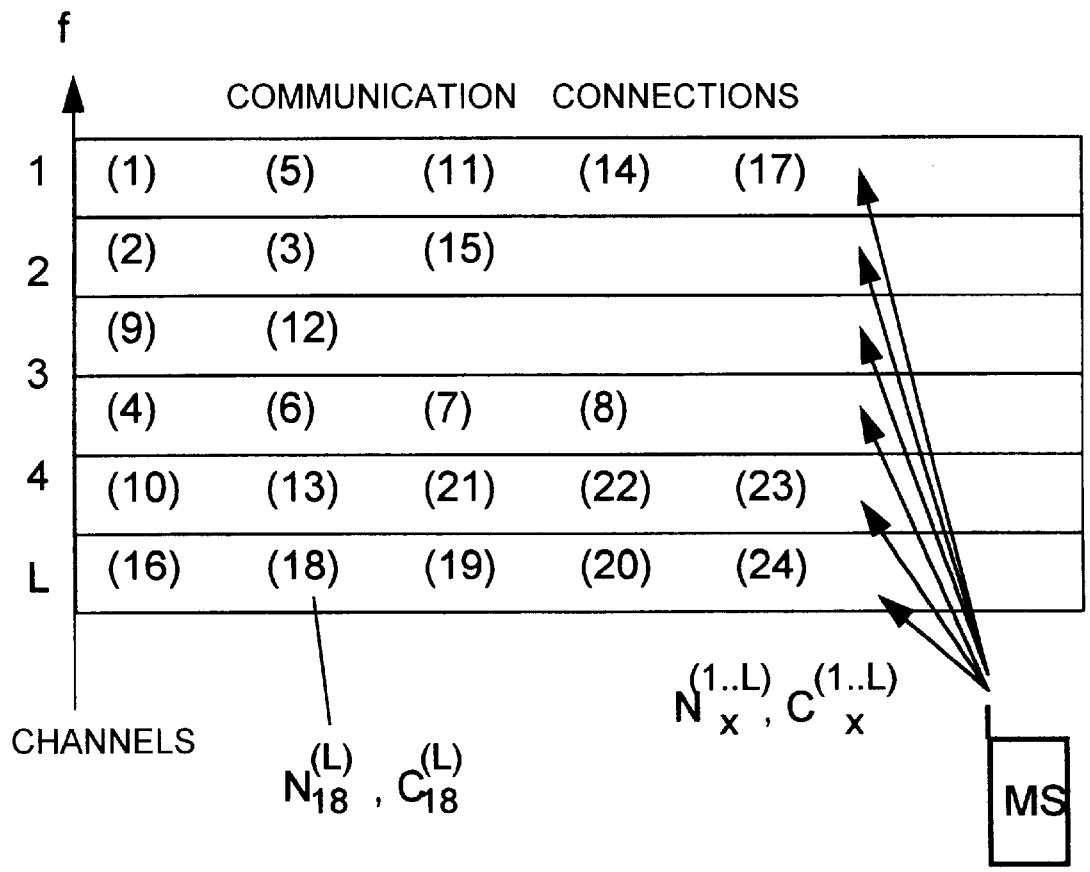
FIG. 2 shows a schematic illustration of a channel allocation problem associated with a mobile communication system.

FIG. 2 illustrates a scenario wherein the base station BS can simultaneously manage communication connections to mobile stations MS 1 through 24 in L=5 channels. The subscriber signals in the channels, for example, the communication connections 1, 5, 11, 14, 17 in channel l, can be distinguished by the individual incident or, respectively, emission directions of sub-waves of the subscriber signals. With reference to FIG. 1, different dominant incident directions that can be distinguished from one another by an azimuth angle are shown for the mobile stations MS 1, 2 and 3.

Individual spatial covariance matrices $C_1^{(l)}, \ldots, C_{24}^{(l)}$ and noise values $N_1^{(l)}, \ldots, N_{24}^{(l)}$ in the respective channel l are determined for each of the 24 communication connections 1 through 24. For example, a noise value $N_{18}^{(L)}$ and a spatial covariance matrix $C_{18}^{(L)}$ is determined for the communication connection 18 in the channel L. These values are continuously updated and stored at the network side in 9 channel allocators.

A channel that meets certain quality criteria is to be selected for a $K^{th}$ communication connection with the index x. Such a quality criterion is the required signal-to-noise ratio SNIR or an equivalent value whose value is predetermined at, for example, 10 dB. Anticipated values, with l=1 . . . L, derive for the $K^{th}$ communication connection with respect to the spatial covariance matrices $C_x^{(l)}$ and the noise values $N_x^{(l)}$. The channel allocation occurs based on these values.

Figure 3:
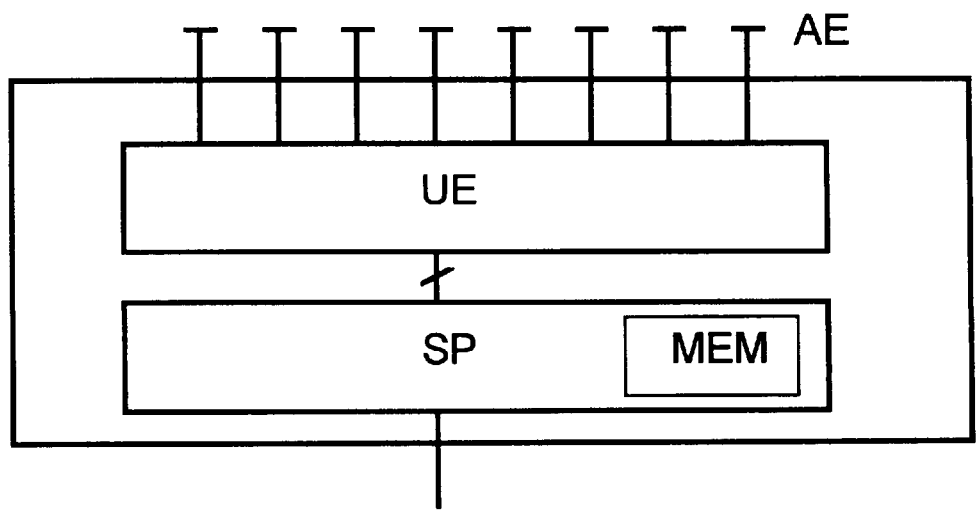
FIG. 3 shows a schematic illustration of a means for channel allocation in accordance with the teachings of the present invention.

FIG. 3 shows an apparatus that undertakes this method of channel allocation. To that end, measured values of the individual radiators of the antenna AE are evaluated in a transmission means UE with respect to the reception signals. After an amplification and analog-to-digital conversion, digitized input values of the reception signals are available for a digital signal processing means SP. Both these input values and further parameters ($K_{ges}$, SNIR, r) as well as programs for the implementation of the following algorithm are stored in memory means MEM. The channel allocator can be arranged in a base station BS or integrated in other network elements, for example a base station controller BSC.

Figure 4:
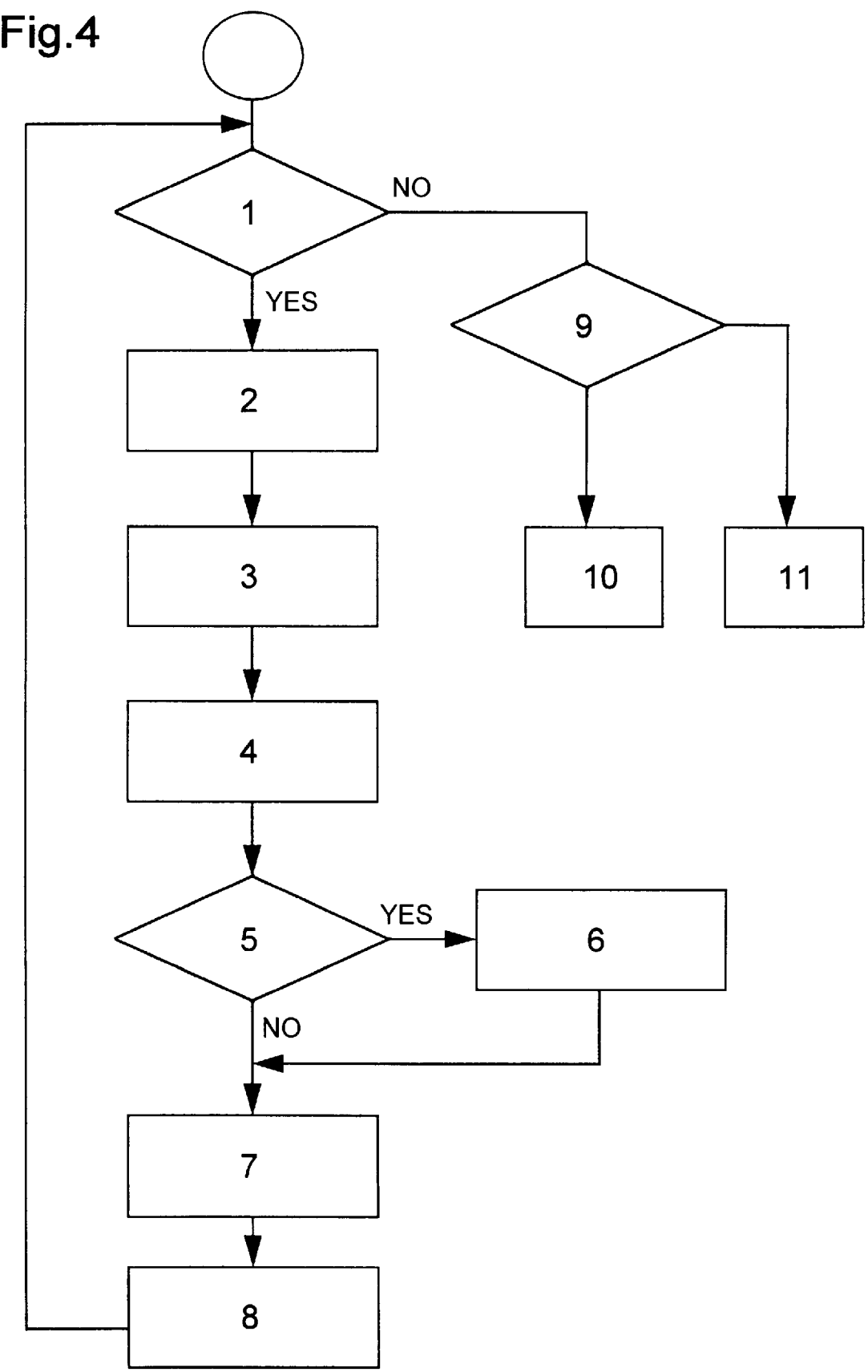
FIG. 4 shows a program flowchart of a method for channel allocation in accordance with the teachings of the present invention.

FIG. 4 shows a program flowchart for the method for channel allocation. A first pointer l is set to l=0. The number of channels L is set to L=5.

In a method step 1, the value l of the first pointer is compared to number of channels L. When l>L applies, l is incremented by 1 and a method step 2 follows.

In the current channel l, the spatial covariance matrices $C_1^{(l)}, \ldots, C_{K-1}^{(l)}$ and the noise values $N_1^{(l)}, \ldots, N_{K-1}^{(l)}$ are determined for the K-1 existing communication connections, for 5 communication connections 1, 5, 11, 14, 17, in the channel 1 of FIG. 2. When these values are already present, they are edited for a later evaluation. Channel-related and communication connection-related (direction-selective) noise values can be derived from a channel estimation or from a data detection either continuously or in periodic intervals. The spatial covariance matrices $C_1^{(l)}, \ldots, C_{K-1}^{(l)}$ are determined for the sub-waves according to a MUSIC or Unitary Esprit algorithm with high-resolution direction identification and are allocated to the communication connections.

In a method step 3, anticipated values are determined for the spatial covariance matrix $C_k^{(l)}$ and the noise value $N_K^{(l)}$ of the $K^{th}$ communication connection in the channel l.

For the downlink, an anticipated value for the reception power of the mobile station of the $K^{th}$ communication connections derives as follows:

$$E\{|\check{x}(t)|^2\} = E\left\{\left|n_k(t) + \sum_{q=1}^{Q_k} \check{b}_{kq}(t)\check{a}_{kq}^H \sum_{l=1}^{K} \check{s}_1(t-\tau_{kq})W_1\right|^2\right\}. \quad (4)$$

When the signals $n_k(t), \check{s}_1(t) \ldots \check{s}_K(t)$ (noise and subscriber signals) are uncorrelated with one another, Equation (4) is simplified as $$E\{|\check{x}(t)|^2\} = N_k + \sum_{l=1}^{K} w_l^H C_k w_l \quad (5)$$

with $$C_k = \sum_{q1=1}^{Qk} \sum_{q2=1}^{Qk} \check{a}_{kq1}\check{a}_{kq1}^H \sigma(\tau) E\{\check{b}_{kq1}^*(t)\check{b}_{kq2}^*\} \quad (6)$$

The autocorrelation function $\sigma(\tau)$ is assumed as constant for all baseband signals $\check{s}_1(t) \ldots \check{s}_K(t)$. The spatial covariance matrices $C_k$ thus unite the parameters needed for the calculation of power values of the downlink.

The evaluation of Equation (6) is simplified when one of the following approximations can form the basis for the radio interface.

The frequencies of the downlink and uplink are at least roughly identical or lead to similar propagation conditions, so that $\check{a}_q = \hat{a}_q$ (group responses in the down link "˅" same as those in the uplink "^" can be assumed.

The channel is not frequency-selective, i.e. running times $\tau_{kq}$ of the sub-waves q=1 . . . Qk are equal or at least similar. The velocities of the mobile stations MS are so low that the complex amplitudes $\hat{b}_q(t), \check{b}_q(t)$ do not differ or differ only slightly.

An anticipated value can thus be determined for the spatial covariance matrix $$C_k = \sum_{q1=1}^{Qk} \sum_{q2=1}^{Qk} \check{a}_{kq1}\check{a}_{kq1}^H \check{b}_{kq1}^* \check{b}_{kq2} = r_k r_k^H \quad (7)$$

whereby $r_k$ indicates a spatial signature for a communication connection k, k=1 . . . K.

When these simplifications cannot be undertaken, then the values of the uplink cannot be applied to the downlink without further ado.

It is assumed for anticipated values with a moderate validity duration that the plurality $Q_k$ of the propagation paths and, thus, of the sub-waves remains about constant, and the complex amplitudes $\check{b}_{kq1}(t), \check{b}_{kq2}(t)$ of two different paths q1 and q2 are uncorrelated. An anticipated value for the spatial covariance matrix thus derives as:

$$C_k = \sum_{q1=1}^{Qk} \breve{a}_{kq}\breve{a}_{kq}^H E\{\breve{b}_{kq1}^* \breve{b}_{kq2}\} = \sum_{q=1}^{Qk} A_{kq}^2 \breve{a}_{kq}\breve{a}_{kq}^H. \quad (8)$$

Whereby a matrix $R_k$ with weighted group responses describes the spatial covariance matrix as follows:

$$C_k = R_k R_k^H,$$

with $$R_k = (A_{k1}\breve{a}_{k1} \ldots A_{kQk}\breve{a}_{kQk}). \quad (9)$$

The rank of the matrix according to (8) is higher than that of the matrix according to (7). By estimating the dominant incident directions of the sub-waves and of the appertaining attenuations, however, an evaluatable presentation of the spatial relationships of the individual communication connections also can be created therewith.

The method steps 2 and 3 also can be implemented in common wherein an existing useful information transmission can be measured for the K−1 communication connections and a signalling for the K$^{th}$ can be measured before the connection setup.

In a method step 4, dominant eigenvectors $u_k$ (normed to the length 1) of the spatial covariance matrices $C_k^{(l)}$ are determined for the K communication connections and a equation system having the form $$\begin{pmatrix} \frac{u_1^H C_1^{(1)} u_1}{N_1^{(1)} \cdot SNIR} & \cdots & -\frac{u_K^H C_1^{(1)} u_K}{N_1^{(1)}} \\ -\frac{u_1^H C_K^{(1)} u_1}{N_K^{(1)}} & \cdots u_K^H C_K^{(1)} \frac{u_K}{N_K^{(1)} \cdot SNIR} \end{pmatrix} \cdot \begin{pmatrix} P_1 \\ P_K \end{pmatrix} = \begin{pmatrix} 1 \\ 1 \end{pmatrix} = \psi\rho \quad (10)$$

is erected for the channel l. The allocation vector p with the elements $P_1, \ldots, P_K$ is determined by solving the Equation (10).

A determination is made in a method step 5 whether one of the elements $P_1, \ldots P_K$ has a negative value. Should this be the case, a decision value $c^{(l)}$ is set to a very large value, for example infinity, in a method step 6.

Otherwise, the decision value $c^{(l)}$ is calculated in a method step 7 with the assistance of the equation $$c^{(l)} = P^{(l)}/\tilde{P}^{(l)} \quad (11)$$

whereby $\tilde{P}^{(l)}$ is a reference power that, as theoretically possible a minimum transmission power, is recited as $$\tilde{P}^{(1)} = SNIR \cdot \sum_{k=1}^{K^{(1)}} N_k^{(1)} / \tilde{\lambda}(C_k^{(1)}) \quad (12)$$

and the anticipated downlink transmission power $P^{(l)}$ for the channel l is calculated with $P^{(l)} = P_1, \ldots, P_K$. In Equation (12), $\lambda(C_k^{(l)})$ indicates the respective dominant eigenvalue of the spatial covariance matrix $C_k^{(l)}$. This execution is repeated for all investigated channels l=1 ... L.

In a method step 8, the previously smallest of the decision values $c^{(l)}$ of all L channels is determined and, when l=L, (i.e. all channels have already been investigated), then compared to a threshold r of 3 dB in a method step 9. The threshold r can be advantageously individually set for each radio interface, for example, by an organization and maintenance center OMC.

When the selected decision value $c^{(l)}$ is smaller than r, the K$^{th}$ communication connection is allocated to the selected channel l in a method step 10. When the selected decision value $c^{(l)}$ is greater than r, the allocation the K$^{th}$ communication connection is rejected and the rejection signalled to the mobile station MS (method step 11).

The noise values measured in the channels L are mainly caused by the other K−1 communication connections in the channel l. This noise or, respectively, this interference cannot be distinguished without further ado from interference from neighboring cells. Given JD (joint detection) CDMA algorithms, this can occur by a discrimination of the various subscriber codes. It can be provided for a better identification of noise value to measure this value at points in time at which the downlink communication in the corresponding channel is limited or, respectively, idle.

A critical aspect of the disclosed allocation method is to compare the theoretical minimum $\tilde{P}^{(l)}$ (given optimum spatial seperability) to the anticipated downlink transmission power $P^{(l)}$ for each channel in the selection of a channel. In order to speed up the calculation, the weightings allocated to the K communication connections are selected proportional to the dominant eigenvectors $u_k(C_k)$. A low value for the quotient in channel l allows one to conclude that the eigenvector $u_k$ for all respective K communication connections respectively fits well to the covariance matrices $C_k$ of the other K−1 communication connections and, thus, a good spatial separability is established.

Although the present invention has been described with reference to specific embodiments, those of skill in the art will recognize that changes may be made thereto without departing from the spirit and scope of the invention as set forth in the hereafter appended claims.

I claim as my invention:

1. A method of channel allocation for a K$^{th}$ communication connection via a radio interface in a mobile communication system with spatial subscriber separation comprising the steps of:

providing at least $K_{ges}$−1 communication connections in L channels for management via the radio interface;

allowing K−1 communication connections in each channel, wherein l=1 ... L;

determining spatial covariance matrices $C_1^{(l)}, \ldots, C_{K-1}^{(l)}$ for the existing K−1 communication connections;

determining noise values $N_1^{(l)}, \ldots, N_{K-1}^{(l)}$ for the existing K−1 communication connections;

determining an anticipated noise value for the K$^{th}$ communication connection;

determining an anticipated spatial covariance matrix $C_K^{(l)}$ for the K$^{th}$ communication connection;

determining an anticipated noise value $N_K^{(l)}$ for the K$^{th}$ communication connection;

determining an anticipated downlink transmission power $P^{(l)}$ for the l$^{th}$ channel with K communication connections in order to adhere to a required signal-to-noise ratio criterion;

determining a decision value $c^{(l)}$ from a relationship of the anticipated downlink transmission power $P^{(l)}$ for the channel l and a reference transmission power ($\tilde{P}^{(l)}$); and allocating the channel l having the lowest decision value $c^{(l)}$ to the K$^{th}$ communication connection.

2. A method as claimed in claim 1, further comprising the steps of:

determining an eigenvector $u_k$ of the spatial covariance matrix $C_K^{(l)}$ for the K communication connections;

developing an equation system $$\begin{pmatrix} \dfrac{u_1^H C_1^{(1)} u_1}{N_1^{(1)} \cdot SNIR} & \cdots & -\dfrac{u_K^H C_1^{(1)} u_K}{N_1^{(1)}} \\ -\dfrac{u_1^H C_K^{(1)} u_1}{N_K^{(1)}} & \cdots u_K^H C_K^{(1)} \dfrac{u_K}{N_K^{(1)} \cdot SNIR} \end{pmatrix} \cdot \begin{pmatrix} P_1 \\ P_K \end{pmatrix} = \begin{pmatrix} 1 \\ 1 \end{pmatrix} = \psi \rho$$

wherein SNIR indicates the required signal-to-noise ratio criterion and $P_1, \ldots, P_K$ indicates elements of an allocation vector p; and determining an anticipated downlink transmission power $P^{(l)}$ with $P^{(l)} = P_1, \ldots, P_K$.

3. A method as claimed in claim 2, further comprising the step of:

determining the reference transmission power according to the equation $$\tilde{P}^{(1)} = SNIR \cdot \sum_{k=1}^{K^{(1)}} N_k^{(1)} / \tilde{\lambda}(C_k^{(1)})$$

wherein $\lambda(C^{k(l)})$ indicates a respective dominant eigenvalue of the spatial covariance matrix $C_k^{(l)}$.

4. A method as claimed in claim 2, further comprising the step of:

setting the value $c^{(l)}$ to a very large value when one of the elements $P_1, \ldots, P_K$ of the allocation vector p has a negative value.

5. A method as claimed in claim 2, further comprising the step of:

determining a dominant eigenvector, which is normed to the length 1 of the covariance matrix $C_k^{(l)}$ for a respective communication connection, for determining the eigenvector $u_k$.

6. A method as claimed in claim 1, further comprising the steps of:

comparing the decision value $c^{(l)}$ to a threshold r; and considering the comparison between the decision value $c^{(l)}$ and the threshold r prior to the step of allocating the channel l.

7. A method as claimed in claim 1, further comprising the step of:

transmitting useful information and signaling information of a radio interface between a base station and mobile stations via the K communication connections.

* * * * *